May 29, 1923.
W. N. GOODWIN, JR
1,456,591
THERMAL AMMETER
Original Filed March 24, 1920    3 Sheets-Sheet 1
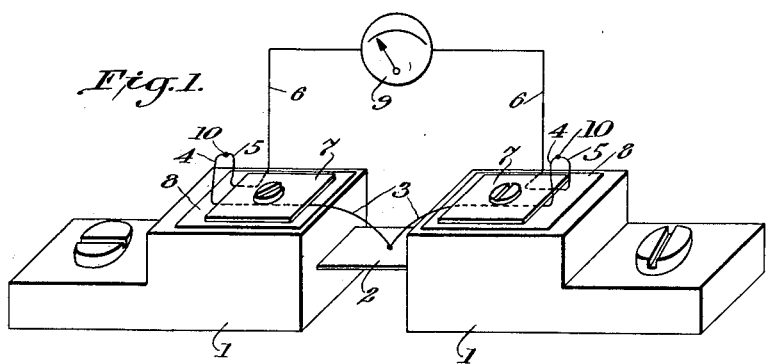
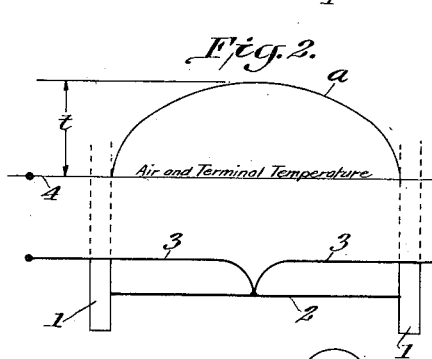
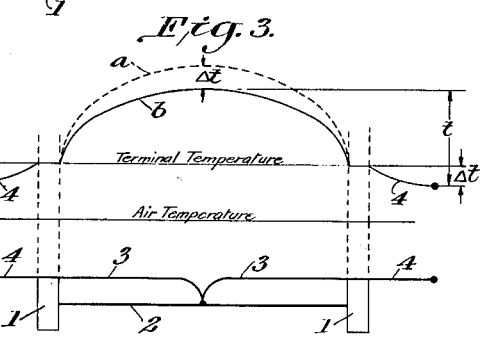
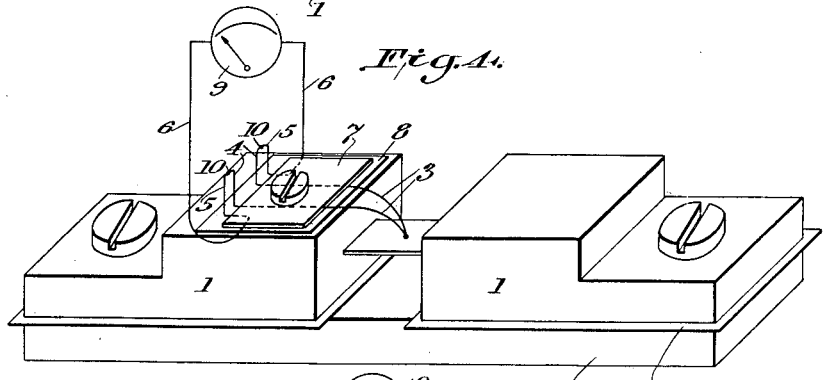
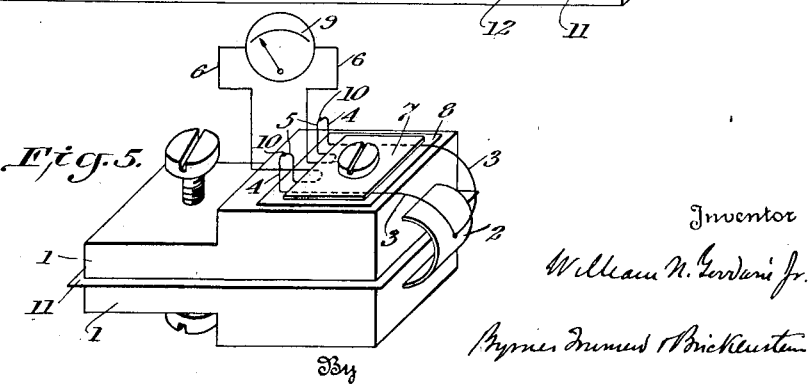

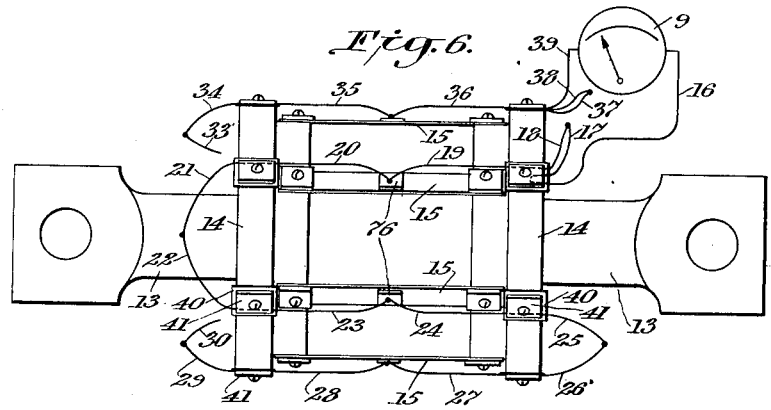
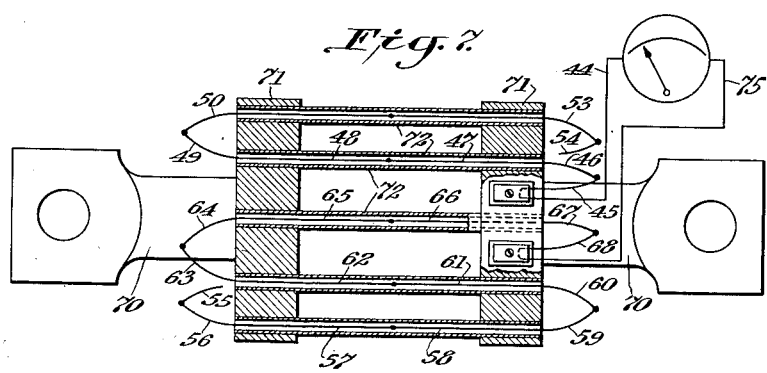
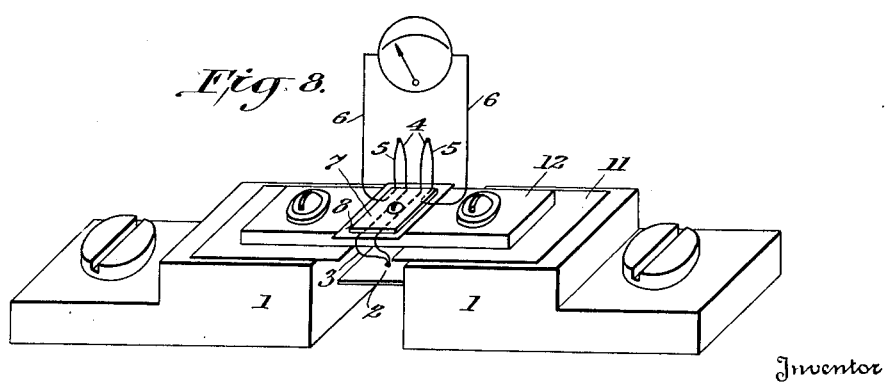

May 29, 1923.

W. N. GOODWIN, JR 1,456,591

THERMAL AMMETER

Original Filed March 24, 1920   3 Sheets-Sheet 3

Inventor
William N. Goodwin, Jr.

By Byrnes Townsend Brickenstein
Attorneys

Patented May 29, 1923.

1,456,591

UNITED STATES PATENT OFFICE.

WILLIAM N. GOODWIN, JR., OF NEWARK, NEW JERSEY, ASSIGNOR TO WESTON ELECTRICAL INSTRUMENT COMPANY, OF NEWARK, NEW JERSEY, A CORPORATION OF NEW JERSEY.

THERMAL AMMETER.

Application filed March 24, 1920, Serial No. 368,407. Renewed October 17, 1922. Serial No. 595,132.

*To all whom it may concern:*

Be it known that I, WILLIAM N. GOODWIN, Jr., a citizen of the United States, residing at Newark, in the county of Essex and State of New Jersey, have invented certain new and useful Improvements in Thermal Ammeters, of which the following is a specification.

My invention relates to improvements in thermal ammeters.

In a previous application for patent, Serial No. 111,737, filed July 27, 1916, Patent No. 1,407,147, on a new form of thermal ammeter for the measurement of current of all frequencies, including radio frequencies, I showed that the difference in temperature between a portion of the heating strip and a terminal, is a measure of the current passing through the strip, provided that the two terminals have the same temperature or always maintain the same temperature difference, and that the strip is thermally very short, that is where practically no heat is lost by convection or radiation into the air. I also showed that whereas this relation is true for a short strip it is not true in general for any length of heating conductor. To provide for the measurement of current in connection with a heating strip of any length I specified and claimed a means for compensating the difference in temperature between the hot portion of the strip and the terminals due to variations in air and terminal temperatures. This is accomplished by providing auxiliary compensating conductors thermally equivalent to the heating strip, in thermal connection with the terminals. The cold end of the couple is in thermal contact with the compensating conductor. For simplicity, two equivalent compensating conductors are used and one of the cold ends of the couple is both thermally and electrically connected to each compensating conductor in order to provide electrical connections from the couple to the indicating instrument.

I have devised other modifications of the same general method for obtaining this compensation of which the following is a description. In these modifications the compensation is effected by one of the following methods, (1) entirely in the conductors of the thermocouple itself, without the use of auxiliary conductors, or (2) partly by both, or (3) entirely by the auxiliary conductors. To make the devices more clearly understood, reference is made to the figures accompanying this description.

Figure 1 shows one of the new forms of thermal ammeter.

Figures 2 and 3 are diagrams.

Figures 4 to 12 show various modified forms.

Figure 9:
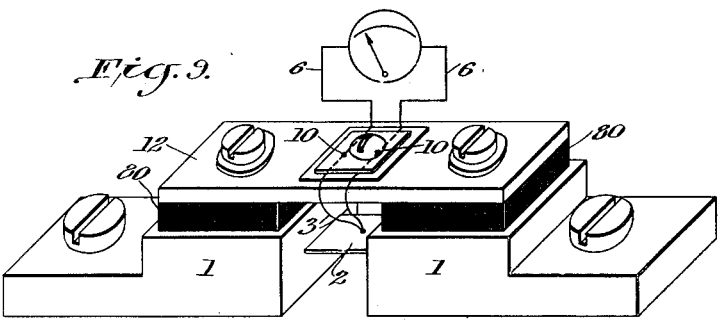

In Fig. 1, 1 and 1 are terminals, to which the heating conductor 2 is connected. A thermocouple 3, 3, has its "hot end" in thermal connection with the heating strip 2 as shown. 8, 8, are thin sheets of insulation, made of mica or other suitable material. The couple wires 3, 3, pass over the terminals, insulated from them by the insulating sheets 8, 8, and are brought into thermal contact with the terminals by means of the clamps 7, 7. The cold ends of the couple 4, 4, extend beyond the terminals into the air. The connections 5, 5, and 6, 6 to the indicating instrument 9 are made of the same material, preferably of copper.

The portions 4, 4 of the couple wires, and the connecting wires 5, 5, extending beyond the terminal into the air must be so designed in regard to cross section, superficial area, length and heat conductivity that the combination of the two will be thermally equivalent to the portions of the heating strip between the corresponding terminal and the point to which the hot end of the couple is thermally connected, so that the temperature of the terminal acting through the body of the wires 4 and 5 by conduction will affect the temperature of the cold end 10 by the same amount as the terminal temperature acting through the body of the strip by conduction, affects the point of the hot strip to which the hot end of the couple is connected; and further, that the surrounding air affects to the same amount the temperatures of the cold end and the heating strip at the point where the hot end is connected. In all places where thermo-couple wires have been referred to, it is understood that strips may be used equally well.

The method by which this compensation is effected is as follows:—As shown in the previous application when no heat is lost from the heating conductor by convection to the air, (that is, when all the heat is conducted through the conductor to the terminals), then the difference in temperature between a point on the heating conductor and a terminal is a measure of the current regardless of the temperatures of the terminals provided they have the same temperature or a constant difference in temperature. If, however, the heating conductor is partially cooled by the air, its temperature rises or falls according to the change in temperature of the air, or in accordance with the relative temperatures of the terminals and air. In order, therefore, that the indication of the instrument shall be unaffected by these changes in temperature not produced by the current, it is necessary that the cold end of the couple be acted upon by the same changes in temperature and to the proper amount so as to maintain the difference in temperature between hot and cold ends constant for any particular valve of the current. These relations are shown graphically in Fig. 2 and Fig. 3.

In both figures, 1, 1 are the terminals; 2 is the heating conductor; 3, 3 the couple wires leading to the hot end; and 4, 4, those leading to the cold ends.

In Fig. 2, assume the temperature of the terminals to be the same as that of the air. The curves above the couple diagram give the temperature relations for all points along the couple wires; from the terminal to the hot junction the temperatures are represented by the curve $a$, and from the terminals to the cold end the temperature is constant and equal to the terminal temperature. The difference in temperature $t$ then is a measure of the current. If, however, the terminal temperatures are higher than the air temperature, which is the case in practice then the conditions are those shown in Fig. 3, where the curve $a$ is that which would obtain if the air and terminals were at the same temperature. Since the air is at a lower temperature than the terminals it produces a lowering in the strip temperature, which amounts to $\Delta t$ at the hot junction, so that the temperature curve now is $b$. Since the current is the same this $\Delta t$ must be compensated. This is accomplished by having the couple and connecting wires 4, 4, and 5, 5, leading to the cold ends exposed to the air which produces a corresponding fall in temperature $\Delta t$, since they are thermally equivalent to the corresponding portions of the heating strip. The difference in temperature between the hot and cold ends is again $t$ which makes this independent of the relative terminal and air temperatures.

It can be shown mathematically that the difference in temperature between the centre of a conductor through which current is passing, and the terminals to which it is connected is:—

$$(T_2 - T_1) = \frac{I^2 R^2}{8 k \rho} \left[ \frac{2(1-m)}{l^2 n^2} \right] - T_1(1-m)$$

Where $T_2$ and $T_1$ are the temperatures of the centre of the strip and the terminal respectively—

I = current through heating strip.
R = resistance of the heating strip.
$k$ = heat conductivity of heating strip material.
$\rho$ = specific resistance of heating strip material.
$l$ = $\frac{1}{2}$ length of heating strip.

$$n = \sqrt{\frac{h}{Ak}}$$

$h$ = heat lost by air convection per unit length of heating strip per 1° C. per second.
A = cross sectional area of heating strip.

$$m = \frac{1}{\cosh ln} = \frac{2}{e^{ln} + e^{-ln}}, \quad \begin{array}{l} e = \text{base natural} \\ \text{logarithms.} \end{array}$$

This equation shows that if $T_1$, has any other value than zero, unless no heat is lost by convection, in which case $m = 1$, and $(1-m) = o$, then the difference in temperature between strip and terminal $(T_2 - T_1)$ cannot be a correct measure of the current since $T_1(1-m)$ enters as an error.

If now we extend the thermocouple conductors into the air, and call the resulting temperature of the cold end $T_0$, due both to conduction from the terminal and convection to the air; the same equation, as stated above for the heating strip, holds equally well for the compensating ends of the thermo-couple if I is made zero, since no current passes through the couple of sufficient magnitude to cause any perceptible heating. Further, the compensatings ends of the thermo-couple were constructed thermally equal to the corresponding portions of the heating strip, therefore the values of $l$ $n$ and therefore for $m$ are the same for both.

Then the difference in temperature between the cold end of the couple and the terminal is $(T_0 - T_1) = -T_1(1-m)$.

The difference in temperature, therefore, between the centre of the heating strip, and a cold end of the couple is then $(T_2 - T_0)$, or is equal to $$(T_2 - T_1) - (T_0 - T_1) = (T_2 - T_0) = \frac{I^2 R^2}{8 k \rho} \left[ \frac{2(1-m)}{l^2 n^2} \right]$$

This shows that the extended cold ends compensate for the error $T_1(1-m)$, and enable the instrument to give indications which are a correct measure of the current I.

In order that the heating strip or conductor and the extended cold ends of the couples shall be strictly thermally equivalent, they must not only be affected by changes in temperature by the same amount, but at the same rate, that is the temperature changes in both must strictly follow each other at the same rate at every instant in order that the correct compensation may be made both for permanent and transient effects. To accomplish this the compensating ends of the thermo-couple and the heating strip must not only have the values of $l\,n$ the same value for both, but both must have the same heat time constant. Since, however, the terminal and air temperatures change slowly, it is sufficient in practice that the two structures be thermally equivalent for permanent changes, and in these specifications and claims, when structures are said to be "thermally equivalent" it is understood to mean that the temperatures of the corresponding points on them are affected to the same amount by changes in temperature of the terminals and of the air surrounding the terminals and heating conductors, or sufficiently closely to the same amount that errors arising in the indication of the instrument from this cause will not be greater than the tolerance permissible in the art of electrical measuring instruments. I do not wish, however, to limit the scope of this invention to merely slow changes in temperature conditions, but wish it understood that the term "thermally equivalent" shall have the above definition for at least slow changes. In the construction shown in Fig. 1 one cold end of the couple is in thermal connection with each terminal, which compensates for any difference in temperature of the terminals.

Fig. 4, shows another method for accomplishing the same result in which both cold ends are in thermal connection with one terminal instead of having one on each terminal. In this case the two terminals are maintained at the same temperature by having a good thermal connection through the base 12 or its equivalent made of material of good thermal conductivity. The base is electrically insulated from the terminals by means of thin sheets of mica or other suitable material 11.

A still further modification is shown in Fig. 5, in which the cold ends of the couple are likewise in thermal connection with one terminal only, and the two terminals are maintained at the same temperature by being mounted in direct thermal contact with each other but insulated electrically by means of thin sheets of mica or other suitable material.

In all instances in these specifications and claims where "thin sheets of mica or other suitable material" is referred to it is understood to mean an electrical insulation of any shape which has a sufficiently high thermal conductivity not to introduce, because of its presence, errors in the indications of the instrument, greater than the tolerance permissible in the art of electrical measurements.

I do not limit myself to a single heating strip or to a single thermo-couple. A plurality of heating conductors arranged in the well known manner for the proper distribution of high frequency currents, having a single couple on each of them, which would usually be connected in series, could be employed.

Fig. 6 shows an arrangement in which a plurality of heating conductors is used to increase the current capacity, on which one couple is used on each heating conductor mounted with extended cold ends according to my new method.

In the figure, 13, 13, are current terminals leading to the centers of two discs 14, 14, made of material of good thermal and electrical conductivity, which form the terminals for the heating conductors and thermo-couples. These discs or terminals may be held in position at the proper distance apart by means of studs properly insulated from the terminals, which for the sake of clearness are not shown. The heating conductors 15, 15, etc. of which the illustration shows six in number, are equally spaced around the periphery of the discs 14, 14, and welded or soldered or otherwise secured to the reduced portions of the discs to have a good electrical and thermal contact. The thermo-couples 19, 20, 23, 24, etc., have their hot ends in thermal contact with a heated portion of the heating strips, insulated from them by thin sheet mica or other suitable material 76, 76, etc. The thermo-couple wires are in thermal contact with the discs and electrically insulated from them by means of thin sheet mica or other suitable insulation 40, 40 and held in position by clamps 41, 41, etc. The thermo-couple wires 21 and 22, 25 and 26, etc., extend beyond the terminal discs into the air, and have such a length and cross section relative to their thermal conductivities, that ends 21 and 22 etc. are thermally equivalent, respectively, to corresponding portions of the heating strip. The couples are connected in series as shown in such a direction as to add their thermo-electromotive forces. The two ends of the series 18 and 37 are connected to the indicating instrument by means of the wires 17 and 16, and 38 and 39 which are preferably of copper. The portions 17 and 38 are thermally equivalent to 18 and 37 and to corresponding portions of the heating strips, in the same manner as was shown in Fig. 1. The temperatures of the cold ends 21, 22 of the couples are therefore compensated for the relative temperatures of terminals and air, and the instrument indication is therefore a correct measure of the current passing as shown above. The thermally adjusted connecting wires 17 and 38, forming loops with the wires 16 and 39 are shown in thermal contact at the loop with the terminal under the same clamp with the couple wires. Obviously these could be equally well clamped to any other convenient part of the terminal and insulated from it.

Another modification is shown in Fig. 7 in which 70, 70, are current terminals connected to the centers of two terminal discs 71 and 71. The heating conductors are in the form of tubes 72, 72, etc., which are symmetrically disposed around a circle near the periphery of the discs. They are preferably small in diameter and have thin walls, and made of material of high electrical resistivity. Thermo-couples 47, 48, 51, 52, etc., pass through the tubes and are insulated throughout their length from them. Their hot junctions are at the centers of the tubes midway between the terminals and their cold ends 49, 50, etc., extend beyond the terminals into the air. The couples are joined in series so as to add their electromotive forces. The ends of the series 67 and 46 are connected by means of the thermally equivalent connecting wires 68 and 45 to the instrument through wires 75 and 44, in a similar manner as described in Fig. 6. The studs which support and properly space the terminals are for the sake of clearness not shown.

For the same reasons as stated for the other cases, therefore, the extended cold ends effect a compensation for the relative temperature of air and terminals and results in a correct indication of the current passing through the heating tubes.

Fig. 8 shows another modification, in which the thermo-couple wires are not in direct thermal contact with the terminals, but are in thermal connection with them through an auxiliary thermal conductor 12, which is in thermal connection with the terminals, but electrically insulated from them.

The thermocouple wires 3 and 3, pass over the thermal conductor 12, clamped in thermal contact with 12 by means of clamp 7, but electrically insulated from it by means of thin mica 8 or other suitable material.

The cold ends 4 and 4, in a similar manner to those described above, extend into the air and are connected with the indicating instrument through the looped conductors 5, 5 and 6, 6. If the thermal conductor 12 is massive and of good thermal conductivity and the thermal connection to the terminals is of negligible thermal resistance, then the exposed ends 4, 4 and 5, 5 must be thermally equivalent to corresponding portions of the heating conductor.

If, however, the conductor 12 is of small cross section, or of low thermal conductivity as it may be made in or desired, or if, the thermal connection to the terminals is not of negligible thermal resistance then compensation can be effected by making the conductor 12 including the thermal connection to the terminals and the cold end extension of the couple, combined, thermally equivalent to corresponding portions of the heating strip. That is, a portion of the compensation can be effected by means of the conductor 12, and its thermal connection to the terminals in a similar manner to the compensating conductors described in the former application, and the rest of the compensation, by means of the extended ends of the thermocouples.

It is obvious that if the terminals are maintained at equal temperatures or at a constant difference in temperature, the thermal conducting means 12 may be in thermal connection with only one of the terminals if desired. If the thermal conductor 12, and its thermal connections to the terminals together are thermally equivalent to the corresponding portion of the heating conductor then the cold ends of the thermocouple may be in direct thermal contact with the bar, instead of extending into the air. Furthermore the bar 12 is not limited to one which is homogeneous, or if the same cross section throughout, or of the same thermal conductivity, it may be composed of a plurality of thermal conductors differing in thermal conductivity in series, and it is further not necessary for it to be an electrical conductor. It is only necessary that it be thermally equivalent to a corresponding portion of the heating strip as defined above.

Fig. 9 illustrates a modification in which the thermal conducting means, including the thermal connection to the terminals, is itself thermally equivalent to the corresponding portion of the heating conductor, and therefore the cold end may be in direct thermal contact with the bar 12. The pieces 80 and 80 are thermal resistors in thermal series with the bar 12 and may be wholly of electrical insulating material, or part electrical insulating material and part metallic, but having the proper thermal resistance, which, when added to that of the bar 12, will make the combination from the terminal to the cold ends, thermally equivalent to the part of the heating conductor from the terminal to the hot junction of the couple. The bar 12 may be of any shape or of any material, including electric insulators or of any thermal conductivity, consistent with the above condition of thermal equivalence. The cold ends 10, 10 of the couple are in good thermal contact with the bar 12 but electrically insulated from it by means of mica or other suitable insulating material. Connecting wires 4, 4 connect the cold ends to the indicating instrument.

Figure 10:
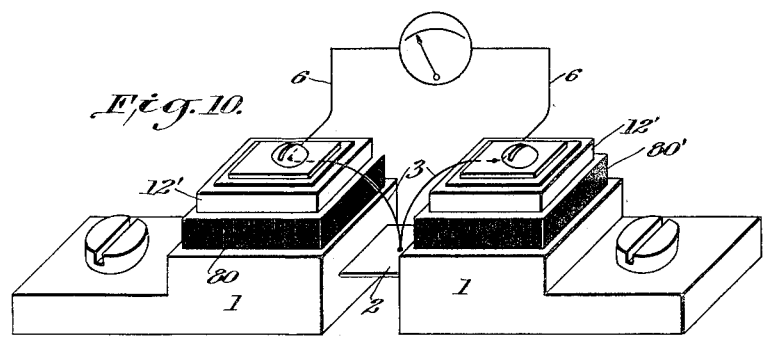

Figure 10 shows another modification of the non-homogeneous thermal conducting means, in which one cold end of the couple is brought to each terminal. The compensating thermal conductors consist of parts 12' and 80', on each terminal of higher and lower thermal conductivities, the combination of which relative to their superficial areas, is thermally equivalent to the corresponding portions of the heating conductor. It is further obvious that the bar 12 in Fig. 9 may be divided lengthwise into two parts, and insulated from each other in which case one cold end of the couple may be soldered directly to each compensating conductor, which in turn may be used as an electrical connection.

A direct analysis of this particular form of the general compensation method, is as follows,—

Assume that the thermal conductor 12' in Fig. 10 for simplicity is of negligible thermal resistance, and that it has a superficial area S, and as a consequence assume that the entire thermal resistance from the terminal to the position of the cold ends of the couple resides in the section 80', and that it has a value $r$. Let the temperature of the terminal be $T_1$ and that of the conductor 12', $T_0$. The amount of heat lost by convection into the air from the conductor 12, is $h\,T_0\,S$ where $h$ is the amount of heat lost per unit area per second per 1° C. above air. Since the heat thus given to the air must be transmitted through the section 80', the drop in temperature through this section is equivalent to the product of the heat rate by the thermal resistance of 80' or $$T_1 - T_0 = hT_0 S r$$

or $$T_0 = \frac{T_1}{1 + hSr}$$

and $$T_1 - T_0 = T_1\left(1 - \frac{1}{1 + hSr}\right)$$

In order therefore that true compensation shall result from any relative temperatures of terminal and air it is necessary that the value $T_1(1-m)$ in the general equation $$(T_2 - T_1) = \frac{I^2 R^2}{8k\rho}\left[\frac{2(1-m)}{l^2 n^2}\right] - T_1(1-m) \text{ shall equal } T_1\left(1 - \frac{1}{1+hSr}\right)$$

in order that their difference shall be zero and thus eliminate the error, that is $$T_1(1-m) = T_1\left(1 - \frac{1}{1+hSr}\right)$$

or $$1 + hSr = \frac{1}{m} = \cosh ln$$

Physically considered, it is only necessary to design the superficial area of the conductor 12' relative to the thermal resistance of 80', so that the lowering in temperature of the conductor 12' below that of the terminal, due to the passage of the heat across the thermal resistance of 80' necessary to supply the losses to the air in 12', shall be equal to the corresponding drop in temperature in the heating conductor below that of the terminal, due to its losses of heat to the air.

Figures 11, 12:
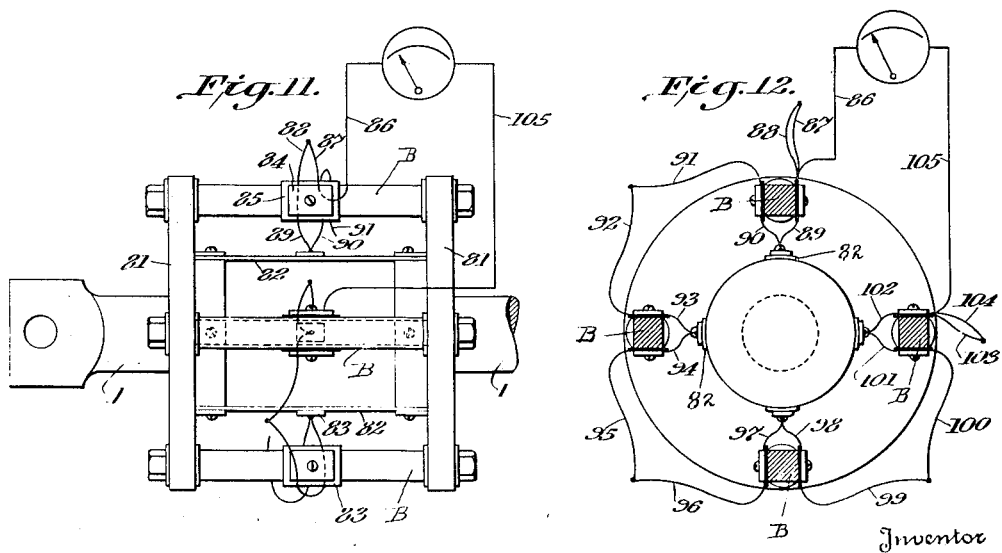

Figures 11 and 12 show a construction applied to a plurality of heating conductors, of which four are shown in the illustration. Current terminals 1 and 1 are joined to the centers of two discs 81 and 81 made of material having good electrical and thermal conductivity.

Thermal conducting bars B, B, B, B, are in thermal connection at their ends with the terminal discs, but electrically insulated from them. These bars may also serve as a means for securing and properly separating the terminal discs 81, 81. Heating conductors 82, 82, 82, 82, for carrying the current, are symmetrically disposed around the periphery of the reduced portions of the discs and are welded, soldered, or otherwise well clamped to the reduced portions of the terminals. The hot junctions of the thermocouples are in thermal contact with the heating strips, but electrically insulated from them by means of proper insulating pieces 83. Portions of the couple wires are clamped in thermal contact with the conducting bars by means of clamps 84, 84, etc., and insulated by proper insulating pieces 85, 85, etc., as previously described for one heating strip and their ends extend into the air for compensation as previously described. The couples are connected in series in such a manner to add their electromotive forces, the sequence commencing with the instrument connecting lead is 86, 87, 88, 89, 90, 91, 92, etc., to 105.

The loops formed by the final connecting wires 86, 87 and 104, 105 are shown as being in thermal contact with the same conducting bars as their corresponding thermocouples. It is obvious that separate bars may be provided for these loops if desired in practice without in any way altering the idea of the invention. As stated in connection with the discussion of a single heating conductor, if the conducting bars are massive and of good thermal conductivity, then the extended ends of the couples must be thermally equivalent to corresponding portions of the heating conductors. If however, the conducting bars are of such a cross section, superficial area, and thermal conductivity that their temperatures are appreciably affected by the surrounding air, then the bars including the thermal connections to the terminals and the couple extensions combined must be thermally equivalent to corresponding portions of the heating conductors.

Further, the bars B, B, B, B, may be constructed to be themselves thermally equivalent to the heating strips or may be made of various materials having different thermal conductivities, so that they are combined thermally equivalent to the heating strips, in which case the cold ends of the couple may be in direct thermal contact with the bars.

In general my invention relates to any means by which a difference in temperature between two parts of a system of thermal conductors of which a part of the conductor connected between terminals heated by the current is one, may be obtained, from which parts all temperature effects other than those due directly to the current to be measured, such as effects arising from relative temperature of air and terminals, have been eliminated by thermal conductors designed in proper thermal relation to both the terminal and air temperatures, and specifically relates to a means for obtaining this correct difference in temperature and for utilizing it as a measure of the current.

I claim:

1. A thermal ammeter comprising terminals; a heating conductor heated by the passage of the current and connected to the terminals; a thermo-electric couple whose hot junction is in thermal contact with the heating conductor, having a portion of the couple and electrical connecting conductors in thermal connection with at least one of the terminals, and its cold ends extending from the terminal into the air surrounding the terminals and heating conductor, between which cold ends and a terminal are free lengths of thermo-couple, and electrical connecting conductors thermally equivalent to corresponding portions of the heating conductor.

2. A thermal ammeter comprising terminals; a heating conductor heated by the current and connected to the terminals; a thermo-electric couple having its hot junction in thermal contact with the heating conductor; a thermal conducting means in thermal connection with at least one of the terminals, a portion of the thermo-couple conductors and of the electrical connecting conductors having thermal connection with a portion of the said thermal conducting means, and the cold ends of the couple extending from the said thermal conducting means into the air surrounding the terminals and heating conductors, the free lengths of the thermo-couple conductors and of the electrical connecting conductors between the cold ends and the aforesaid thermal conducting means being, together with the said thermal conducting means, thermally equivalent to a corresponding portion of the heating conductor.

3. A thermal ammeter comprising terminals; a heating conductor heated by the passage of the current and connected to the terminals; a thermo-electric couple having its hot junction in thermal contact with the heating conductor; a thermal conductor of negligible thermal resistance in thermal contact with at least one of said terminals; portions of the thermo-couple conductors and of the electrical connecting conductors in thermal connection with said thermal conductor, and the cold ends of the couple extending from the aforesaid thermal conductor into the air surrounding the terminals and heating conductor, the free portions of the thermo-couple and electrical connecting conductors extending between the aforesaid thermal conductor and the cold ends of the thermo-couple being thermally equivalent to corresponding portions of the heating conductor.

4. A thermal ammeter comprising thermally connected but electrically insulated terminals, a heating conductor heated by the passage of the current and connected to the terminals; a thermo-electric couple having its hot end in thermal contact with the heating conductor, and portions of the thermo-couple conductors and of the electrical connecting conductors in thermal contact with one of the said terminals, and its cold ends extending into the air surrounding the terminals and heating conductor, between which cold ends and the terminal are free lengths of thermo-couple conductors and of electrical connecting conductors thermally equivalent to the corresponding portion of the heating conductor.

5. A thermal ammeter comprising terminals; a heating conductor heated by the passage of the current and connected to the terminals; a thermo-electric couple having its hot junction thermally connected to the heating conductor, a portion of the positive conductor of the thermo-couple and of the electrical connections thereto in thermal contact with one terminal, and the negative conductor of the thermo-couple and electrical connection thereto in thermal contact with the other terminal, and the cold ends extend from their respective terminals into the air surrounding the terminals and heating conductor, between each of which cold ends and the corresponding terminal there are free lengths of thermo-couple conductors and of electrical connecting conductors thermally equivalent to corresponding portions of the heating conductor.

6. A thermal ammeter comprising terminals; a plurality of heating conductors heated by the passage of the current and connected to the terminals; a corresponding plurality of electrically connected thermo-electric couples, having their hot junctions each in thermal contact with a heating conductor and their cold ends extending beyond the terminals into the air surrounding the terminals and heating conductors; portions of electrical conductors connected to cold ends of the series, and corresponding portions of thermo-couple conductor, in thermal connection with at least one terminal, these portions of electrical conductors and thermo couple conductors being thermally equivalent to corresponding portions of heating conductor.

7. A thermal ammeter comprising terminals; a plurality of heating conductor tubes connected to and passing through the terminals, a plurality of electrically connected thermo-couples passing through the tubes but electrically insulated therefrom, having their hot junctions in thermal contact with the heating tubes, and portions of the thermo-couple conductors in thermal contact with the terminals, the cold ends of the couples extending from the terminals into the air surrounding the terminal and heating tubes, between which cold ends and the corresponding terminal are free lengths of thermo-couple and electrical connecting conductors thermally equivalent to corresponding portions of the heating tubes.

8. A thermal ammeter comprising terminals; a heating conductor heated by passage of the current and connected to the terminals; a thermo-couple having its hot junction in thermal contact with the heating conductor; thermal compensating conductors to which the cold ends are thermally connected, consisting of a plurality of parts having different thermal resistances of such values, relative to their superficial areas, that the combined thermal conductor between the cold end contacts and a terminal is thermally equivalent to corresponding portions of the heating strip:

In testimony whereof, I affix my signature.

WILLIAM N. GOODWIN, Jr.